Aug. 15, 1967 V. MARASCO 3,335,712
CHARCOAL BROILER
Filed Oct. 23, 1965 2 Sheets-Sheet 1
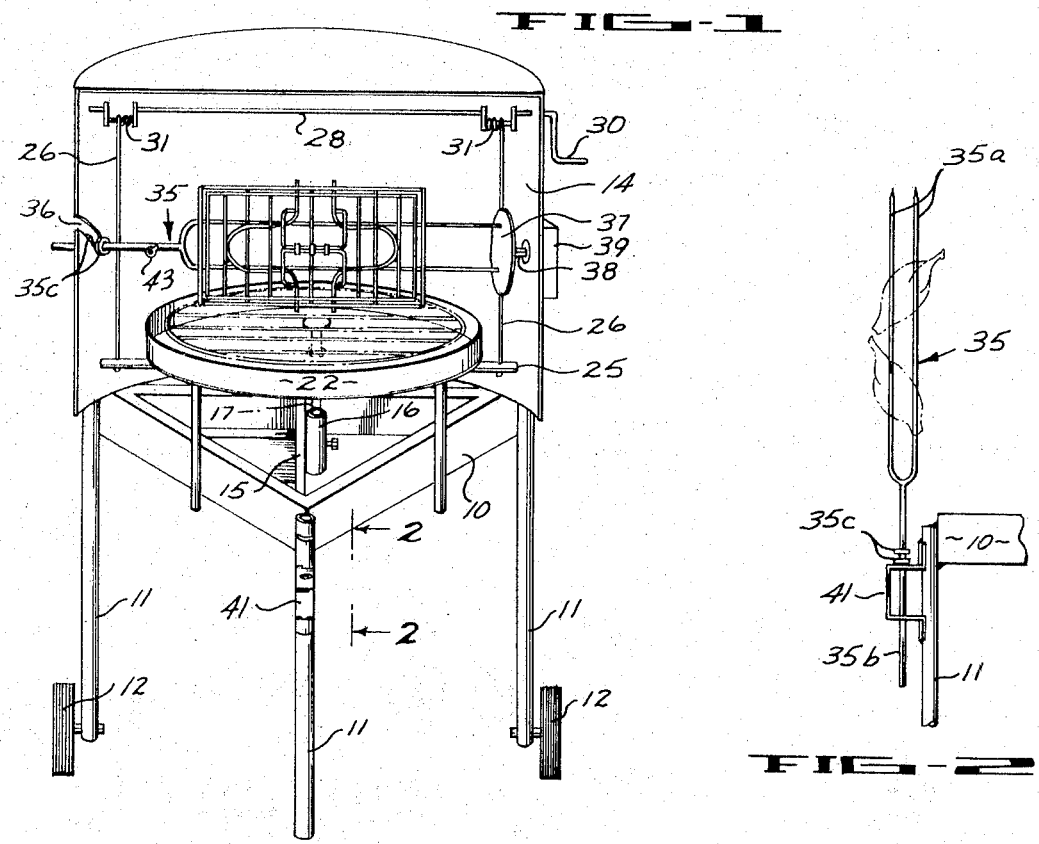
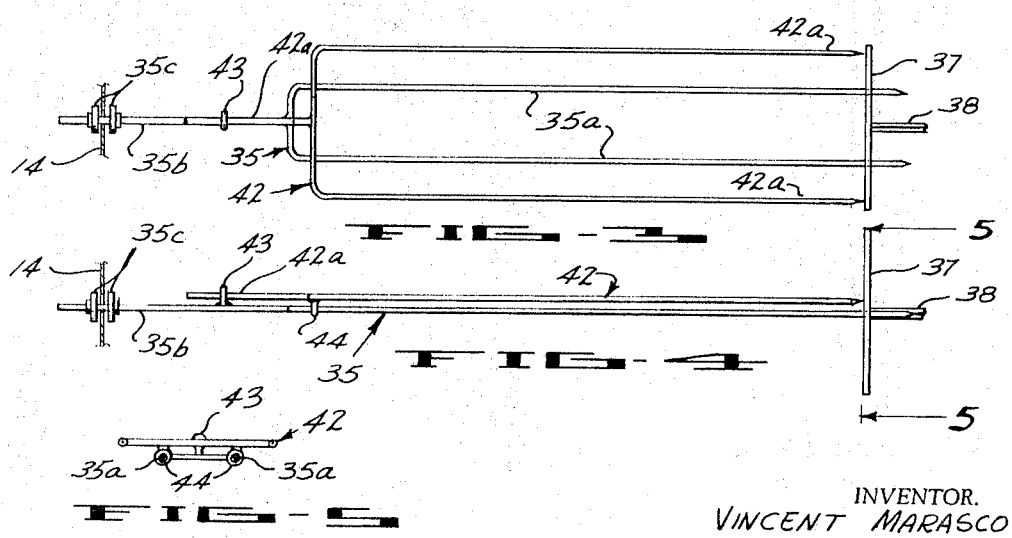
INVENTOR.
VINCENT MARASCO
BY Knight & Rodgers
ATTORNEYS Aug. 15, 1967  V. MARASCO  3,335,712
CHARCOAL BROILER
Filed Oct. 23, 1965  2 Sheets-Sheet 2
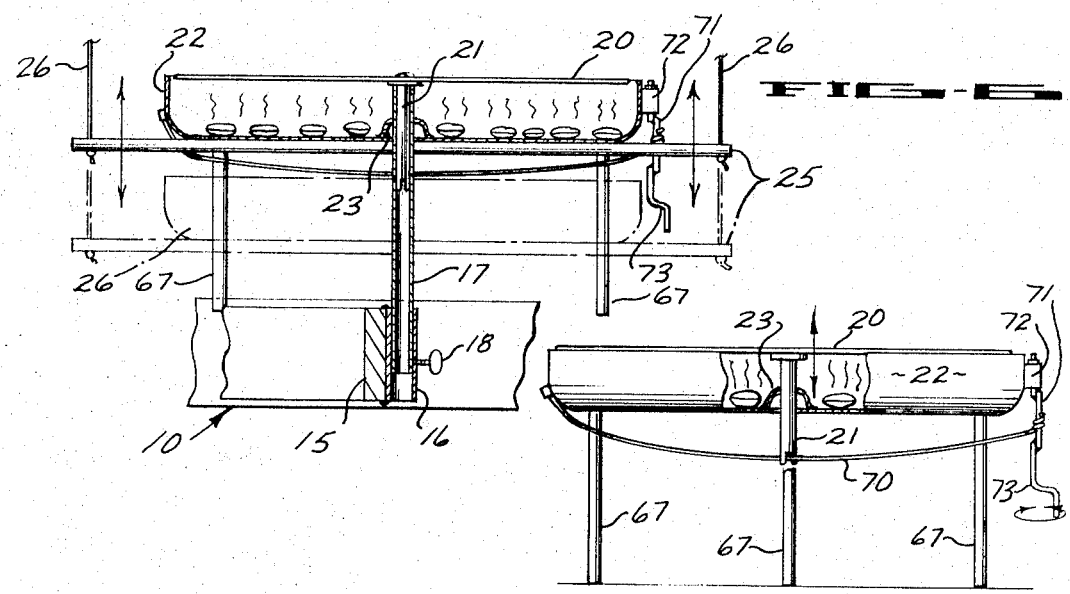
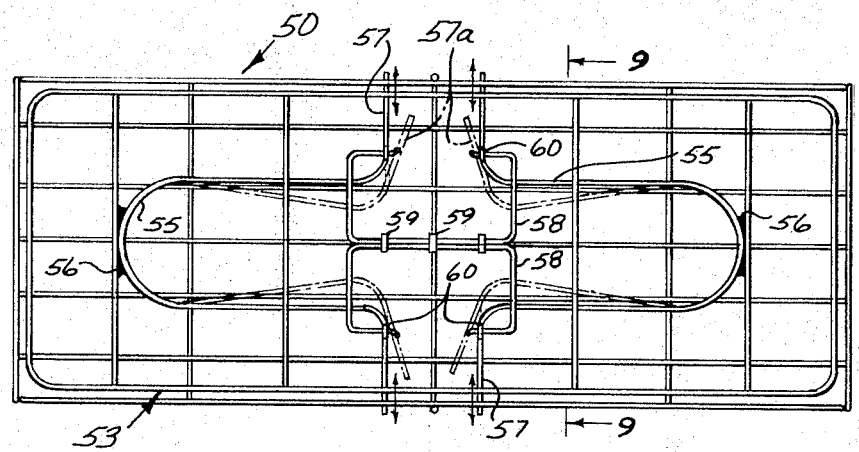
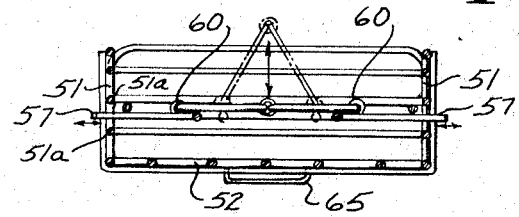
INVENTOR.
VINCENT MARASCO
BY
*Knight & Rodgers*
ATTORNEYS

United States Patent Office 3,335,712
Patented Aug. 15, 1967

3,335,712
CHARCOAL BROILER
Vincent Marasco, 1364 N. Western Ave.,
Los Angeles, Calif. 90027
Filed Oct. 23, 1965, Ser. No. 503,732
14 Claims. (Cl. 126—25)

The present invention is concerned generally with cooking apparatus for roasting or broiling food over an open fire such as is provided by a bed of charcoal; and it is more particularly concerned with cooking apparatus of this type which is commonly referred to as a barbecue and is especially designed for use in patios, backyards, and the like.

Cooking apparatus of this type generally has a fire bowl or brazier which holds a bed of charcoal to provide the source of cooking heat. Above the bowl there may be a stationary, generally horizontally extending grill on which meat can be broiled. Some types of apparatus have in addition a rotating spit on which roasts, fowl, and other larger pieces of meat can be rotatably mounted to turn slowly above the fire for roasting or broiling. While equipment of this type is intended primarily for domestic use in limited outdoor areas and is therefore movable, it is not of such a character that it is generally considered to be portable. That is, it cannot be easily carried over any considerable distance.

It is a general object of the present invention to provide a novel and simplified design for cooking apparatus of the type described that is especially versatile and flexible in use, allowing it to be used equally well for cooking a wide variety of meats, whether the pieces are large or small.

It is also an object of the present invention to design a novel type of grill or spit for cooking apparatus of this type which is easier to use, in that placement of the food on the spit or removal therefrom is rendered easier.

In the same connection, it is also an object of the present invention to provide a novel design of a food holder, of the type commonly referred to as a basket, which is of particular design to mount steaks or other pieces of meat on a rotating grill without the necessity of skewering or piercing the meat with the spit.

A still further object of the present invention is to provide a novel design of a charcoal broiler which gives a higher degree of portability because a portion of the apparatus can be removed and carried with comparative ease when separated from the heavier portions of the barbecue.

These objects of the present invention are achieved by providing a stand on which a fire bowl is removably mounted. Above the fire bowl is preferably a horizontally extending grill which can be adjustably spaced with respect to the fire by novel means for raising and lowering the fire bowl itself. When removed from the stand, the fire bowl can be supported on the ground by a plurality of legs on the bowl and the same grill can then be raised and lowered with respect to the fire bowl by movement of the grill.

Rotatably mounted on the stand above the fire bowl is a spit comprising one fork having a pair of tines projecting from a shank which is preferably located midway between the tines. The two tines are received in a rotatable supporting member having a stud or pin coaxial with the shank of the tines whereby the fork can be mounted on the stand to be rotated by a motor or other means for turning the spit. In order to increase the capacity of the spit, a second fork can be mounted upon the first one to turn therewith by means of interengaging loops attached to the two forks.

When it is desired to cook pieces of meat that do not lend themselves to being pierced by the tines of the fork, they can be placed in a basket of novel design which has a cover or lid that closes the open side of the basket and holds the food between the lid and the bottom of the basket, lid fastening means of novel design being engageable with the sides of the basket at different points in a manner to clamp the food in place and maintain it in position without shifting as the basket is rotated by the fork to which it is attached.

How these and other objects and advantages of the present invention are achieved will be more readily understood by reference to the following description and to the annexed drawing, in which:

FIG. 1 is a front perspective of a charcoal broiler embodying the present invention.

FIG. 2 is a fragmentary side elevation illustrating how a forked spit can be mounted on the broiler stand for placement of meat on the spit.

FIG. 3 is a plan view of a spit of novel design comprising two forks assembled together.

FIG. 4 is a side elevation of the assembly of two forks of FIG. 3.

FIG. 5 is an end view of the fork assembly of FIG. 4 from the right end thereof.

FIG. 6 is a fragmentary median vertical section through the fire bowl and stationary grill and the supports therefor, showing how the fire bowl is raised and lowered with respect to the grill.

FIG. 7 is a combined side elevation and median section of the fire bowl removed from the stand and supported on the ground.

FIG. 8 is an enlarged plan view of the basket for mounting on the fork to be rotated thereby.

FIG. 9 is a vertical transverse section through the basket on line 9—9 of FIG. 8.

Referring now to the drawing, and more particularly to FIG. 1, it will be seen that the charcoal broiler illustrated therein comprises a stand having a triangular frame 10 supported on three legs 11, two of which are provided with wheels 12 to make the unit more easily movable from place to place when the third leg is lifted off the ground. Resting on frame 10 is a hood 14 which serves not only as a shield to screen the fire bowl and food from the wind, such screening being desirable to prevent the food from being cooled too much, but the hood also serves as a part of the stand or framework upon which the spit is rotatably mounted above the fire bowl, as will be more particularly described.

Extending from front to rear across the open triangular frame 10 is a cross brace 15 to which is attached a short length of tubing 16 with its axis vertical. Tubing 16 provides a mounting sleeve for a second sleeve 17 which, as shown particularly in FIG. 6, is of an outside diameter such that it is slidably received within the first tubing 16, the inner sleeve being held at any desired height by tightening thumb screw 18. Alternatively, sleeve 16 can be extended upward for the full height of inner sleeve 17; but the two sleeves are preferred in order to gain a greater flexibility in the height at which grill 20 is mounted.

Grill 20 is an open mesh grill, which may be of any suitable design and, as typical of well known designs, comprises a ring with a plurality of parallel transverse wires. At the center of grill 20 is mounted a short stem 21 which is slidably received within the inner sleeve 17, as shown particularly in FIG. 6. Thus, it will be seen that the grill 20 on which food is supported is mounted upon stand frame 10 by sleeves 16 and 17 and is supported thereon independently of fire bowl 22 which is normally positioned immediately below grill 20.

Bowl 22 may be of any desired size or shape but is generally a comparatively shallow bowl. Preferably the bowl is shaped with more or less of the bottom flat, as shown; and the bowl is slightly larger in its inner diameter than grill 20. Bowl 22 has a central opening through which sleeve 17 passes with a minimum clearance. In order that particles of charcoal held in the bowl do not fall out, and at the same time to allow the bowl to move freely lengthwise of sleeve 17, a domed, apertured guard 23 may be welded or otherwise attached to the bowl and around sleeve 17.

Fire bowl 22 is movably supported on the broiler frame by cross bar 25 which extends transversely underneath the bowl to engage the bowl at its underside. At the ends of cross bar 25 at positions beyond the bowl, the cross bar is supported by being attached to a pair of flexible supporting members, for example small diameter wire cables 26.

Two cables extend upwardly from cross bar 25 to a point of connection with crank means incorporated in shaft 28 which is rotatably mounted in the upper portion of hood 14 and is provided at one end with a crank handle 30, or other similar means, which serves as a means for manually turning shaft 28. Shaft 28 is here shown as being provided with a pair of spaced cranks 31 to which cables 26 are respectively connected; but it will be understood that it is within the scope of the invention to provide only a single elongated crank.

The purpose of this arrangement is to raise and lower fire bowl 22 with respect to grill 20. This is accomplished by turning handle 30 which rotates shaft 28, the cranks 31 being rotated thereby about the axis of rotation of shaft 28 which is established by the points at which shaft 28 is rotatably mounted on the stand by hood 14.

Each crank 31 serves as a drum upon which the two supporting cables 26 are wound equally upon each rotation of shaft 28, the amount of shortening of the cables for each revolution of shaft 28 depending upon the diameter of the drum element at crank 31 upon which the cables are wound. Because of the weight of the fire bowl, the cranks are biased by the load they carry to a position at which they are both directly below the shaft bearings when shaft 28 is free. Consequently, they naturally reach a stable position once during each revolution of shaft 28; and this may occur several times between the two positions of the bowl and cross bar 25 illustrated in the full line and dotted line positions of FIG. 6, which may respectively be taken as representing the raised and lowered positions of the fire bowl. By raising and lowering the fire bowl, the spacing between the burning charcoal and the bowl and the food on grill 20 may be adjusted as desired; but of course additional adjustment may be obtained by raising and lowering grill 20 and sleeve 17 by loosening thumb screw 18 so that the full range of adjustment is not limited to the range of travel of cross bar 25.

For increased versatility or flexibility in the foods that can be cooked, it is desired to provide a rotating spit at a location above fire bowl 22. When a spit is a single bar or rod, it is necessary to provide clamps or sliding prongs of some type which engage the food in order to cause the food to turn with the spit. In order to eliminate such extra parts, it is preferred to make the spit in the form of a fork 35, as shown particularly in FIGS. 1 and 2. This fork has a pair of tines 35a which are parallel to each other and extend away from a central shank 35b which is midway between the two tines. The ends of the tines are sharpened to facilitate piercing food. The shank 35b is preferably round so that it turns freely in the base of a slot 36 in the wall of hood 14, as shown in FIG. 1, thus rotatably mounting one end of the spit on the barbecue frame.

To rotatably mount the other end of the spit, the ends of the tines pass through openings in disc 37, the two openings being spaced apart by the spacing between tines 35a so that the tines are slidably received in the disc openings. At one side, the disc is provided with a square stud or pin 38 which is received in a square socket which is rotated by motor unit 39 in a well known manner. Shank 38 on disc 37 is midway between the openings through which the tines pass, thereby locating shank 38 coaxially of fork shank 35b to establish a horizontal axis about which the fork rotates.

Since the spit is inserted in at least one of the supporting elements by endwise movement, it is generally desirable to provide means on the spit to prevent undesired endwise shifting of the spit while it is being rotated. Various devices for this purpose can be supplied. However, a simple and effective one is to provide two spaced collars 35c which can be adjustably located and locked in position on the round shank 35b of the fork. The two collars are spaced apart to be on opposite sides of the wall of hood 14, thereby holding the spit against endwise shifting in either direction. Alternatively, only one may be necessary, typically to bear against the inside face of the hood wall while a similar means is provided at the other end of the fork that, by engagement with disc 37, prevents shifting toward the right in FIG. 1.

It will be understood that various other constructions and arrangements of the spit are contemplated within the scope of the present invention. For example, shank 35b of the forked spit can have a squared end in order to be received in a socket, such as that at 38 to drive the spit from the other end. In that event, pin 38 on disc 37 may be round and rotatably mounted in a suitable journal, either permanently or removably.

It is preferred to mount on one of the stand legs 11 a bracket 41, as shown in FIG. 2, having a pair of openings designed to receive fork shank 35b to hold the fork in an upright position, as illustrated. In this position, meat, such as a roast or fowl, can be skewered on the fork by pressing down on the meat to cause the fork to pierce the meat. The fork is held securely by the barbecue stand, enabling the cook to utilize both hands. This is an advantage over many types of spits which require that the spit be held in one hand and pushed through the meat with the other hand in order to load the spit.

In order to increase the capacity of the spit, it may be preferred to add to fork 35 a second fork 42 having a pair of tines 42a which are more widely spaced than the tines 35a. Fork 42 is provided with a single shank 42a which is likewise midway between the tines of the fork so that it parallels closely the axis of rotation.

The two forks can be held in a unitary assembly by very simple elements on the two forks causing the two forks to interengage. By referring to FIGS. 4 and 5, it will be seen that a single eye or loop 43 on shank 35b of fork 35 receives shank 42a. The other fork 42 has a pair of similar eyes 44 which are spaced to receive the two tines 35a so that when the two forks are assembled by relative endwise or axial movement, they can be interengaged to form a unitary assembly. They are further held together by the meat carried on them. Tines 42a are shorter than tines 35a so that the latter tines project beyond the tines 42a and enter the openings in disc 37, as shown in FIG. 3. Tines 42a engage the face of disc 37 to hold fork 42 against endwise shifting.

In order to further improve the versatility and usefulness of the barbecue, it is designed to provide a novel type of basket for holding steaks, chops, or other small pieces of meat which is desired to mount on the spit for rotation above the fire. This basket arrangement is shown particularly in FIGS. 8 and 9. It comprises a wire basket, indicated generally at 50, which is open mesh. The basket is preferably rectangular in outline, although not necessarily so, and is provided with side walls 51 which rise at opposite sides of the basket above bottom wall 52. All walls of the basket are made of open mesh of any suitable construction, although side walls 51 have wires 51a extending generally parallel to the plane of bottom 52. The basket is open at one side, normally considered to be the upper side, and this side may be closed by a removable lid or cover 53 which is smaller than the open side so the cover can be moved down in the basket and into contact with the food therein in order to clamp the food between the lid and bottom wall 52.

Lid 53 is held in place by a pair of wire bow springs 55 which are attached centrally at 56 to elements of the lid, thus leaving the two free ends 57 of each of the two bow springs capable of movement laterally of the basket. These free ends of the two bow springs are moved outwardly through opposite side walls 51 of the basket by an overcenter toggle mechanism consisting of a pair of rectangular wire loops 58 which are hinged together at 59 in back-to-back relationship and form a handle as well as a toggle. The wire loops 58 are generally U-shaped with inwardly turned ends which are loosely and slidably received in loops or eyes 60 attached to the free ends 57 of the bow springs, as may be seen in FIGS. 8 and 9, at the laterally projecting portions thereof.

When the adjoining or interconnected sides of the two handle loops 58 are depressed, the opposite sides of loops 58 are moved outwardly. This motion is transmitted by engagement of the handle with the four eyes 60 to the ends of the bow strings, and the free ends 57 are thus forced outwardly between the wires 51a of basket walls 51 to be engaged thereby and hold the loose pieces of meat between the cover and bottom wall 52. By picking up the handle, as with the tine of a cooking fork, and raising it at the adjoining or hinged connections 59, the outer ends of the handle loops 58 are retracted and brought together. The free ends of the bow springs are released to spring back to the dotted position 57a of FIG. 8 in which they are moved inwardly and clear of the side walls 51 of basket 50. Now lid 51 can be lifted upwardly out of the basket by continued lift applied to handle 58.

The basket normally has several horizontal wires 51a in each side under which the ends of bow springs 57 can pass. The resiliency of these several elements clamps the pieces of meat in place, holding them firmly as the basket turns. This arrangement also accommodates different thicknesses of the layer of meat in the basket.

Any suitable means for mounting basket 50 on fork 35 to be rotated thereby above the fire, may be provided. As typical of such means, there will be seen in FIG. 9 brackets 65 attached to the underside of basket 50. Two such brackets are provided, preferably being at the respective ends of the basket. The width of bracket 65 is made equal to the overall width of fork 35 so that the two tines of the fork slide in between the ends of brackets 65. In this way, the basket is mounted on the fork to rotate. An alternative arrangement would be to provide two pairs of eyes, similar to the eyes 44 provided on the wider fork to receive the tines of fork 35.

It is desirable to design the entire broiler so that the fire bowl can be taken out and used as a portable broiler. To permit this, bowl 22 is provided with its own set of legs 67, as shown in FIG. 7. Typically, three legs are suitably attached to the bowl. In view of the triangular shape of frame 10, it is appropriate to provide three legs since in this case the legs can be arranged to clear the elements of the triangular frame and thus allow the bowl to move up and down without interference, in the manner previously described.

The same grill 20 is used with the fire bowl when it is taken out of the stand and the bowl supported on the ground by legs 67, as shown in FIG. 7. The grill is now no longer supported on center sleeve 17 but remains attached to stem 21. Stem 21 is engaged at its lower end by cable 70 which passes underneath the fire bowl. One end of the cable is secured to the bowl in any suitable manner while the other end is attached to crank 71 which is rotatably mounted in a suitable type of bearing 72 on the fire bowl at a point diametrically opposite the point of attachment of the first end of the cable. Crank 71 is turned by handle 73.

Turning the crank in one direction wraps cable 70 on the crank, thereby shortening the cable and taking up the slack in it with the effect of raising stem 21 and grill 20 at the upper end of the stem. Turning crank 71 in the opposite direction by means of handle 73 lengthens the cable and increases the slack in it, thereby lowering the stem and grill with respect to the fire bowl and the charcoal fire within it.

The weight of the grill and stem pulling on the crank biases the crank to one position in which it is closest to the center stem. Hence, the crank will remain stable in this position without any detent means; and several positions of adjustment can be obtained within the range of movement of the grill. A finer degree of adjustment can be obtained with a small diameter of the crank section which forms the drum on which the cable is wound. The eccentricity of the crank is relatively immaterial, since it has no bearing on the mechanical advantage gained by the crank.

From the foregoing description it will be apparent that various changes in the detailed construction and arrangement of the parts of the present invention may be made without departing from the spirit and scope thereof. Accordingly, it is to be understood that the foregoing description is considered as being illustrative of, rather than limitative upon, the invention as defined by the appended claims.

I claim:

1. Cooking apparatus comprising:
   a stand;
   a fire bowl movably mounted on the stand;
   grill means on the stand supporting food over the bowl;
   and means raising and lowering the fire bowl relative to the grill means, such means comprising
   a horizontally extending shaft rotatably mounted on the stand and including crank means eccentric relative to the axis of the shaft;
   and flexible support members supporting the fire bowl, said flexible members being connected to the crank means to be wrapped thereon by rotation of the shaft, whereby the fire bowl can be raised or lowered and the weight of the fire bowl biases the shaft and the crank means to a position in which the crank means is below the axis of the shaft.

2. Cooking apparatus as in claim 1 in which the crank means raising and lowering the fire bowl comprises a pair of spaced cranks, a rigid cross bar passing underneath and engaging the bowl, and a cable at each end of the cross bar and attached to the respective cranks.

3. Cooking apparatus as in claim 1 in which the grill means includes a fork having a shank and a pair of tines;
   and a fork support slidably receiving said tines and having a stud coaxial of the fork shank, said shank and stud rotatably supporting the grill on the stand.

4. Cooking apparatus as in claim 1 in which the grill is provided with a shank rotatably supporting the grill on the stand to turn about a horizontal axis;
   and which also includes means on the stand slidably receiving the grill shank to hold the grill upright for affixing or removing food from the grill.

5. Cooking apparatus as in claim 1 in which the grill includes
   a first fork having a shank and a pair of tines;
   a second fork having a shank and a pair of tines;
   means on the first fork to slidably receive the shank of the second fork;
   and means on the second fork to receive slidably the tines of the first fork,
   whereby the two forks can be engaged by endwise movement to form a grill rotatable as a unit.

6. Cooking apparatus as in claim 1 in which the grill comprises
   an open mesh basket open at one side and having openings in the mesh of the basket at two opposite sides of the basket;
   a lid for the basket closing said open side;

and over-center lid fastening means mounted on the lid and including extendible members movable outwardly through said openings in the basket at opposite sides thereof to hold the lid in place closing said open side, and an over-center operator connected to said arms to extend said arms through said openings.

7. Cooking apparatus comprising:
a stand;
a fire bowl mounted on the stand;
grill means for holding food to be cooked over the fire bowl, said grill means including a fork having a shank and a pair of tines;
and means to rotatably mount the grill on the stand, the last-mentioned means including:
  a fixed support engaging the fork shank allowing the fork to turn thereon,
  and a fork rotating member with a pair of spaced openings slidably receiving the tines and a stud coaxial of the fork shank to establish the axes of rotation of the fork.

8. Cooking apparatus comprising:
a stand;
a fire bowl mounted on the stand;
grill means for holding food to be cooked over the fire bowl;
and means to rotatably mount the grill on the stand, said grill means including a fork having a shank and a pair of tines;
a fork support slidably receiving said tines and having a stud coaxial of the fork shank, said shank and stud rotatably supporting the grill on the stand;
a second fork having a shank and a pair of tines;
means on one fork to receive slidably the shank of the other fork;
and means on the other fork to receive slidably the tines of said one fork, whereby the two forks can be engaged by endwise relative movement to form a grill rotatable as a unit.

9. A rotating spit adapted to support food thereon to be broiled, comprising:
a fork having a shank and at least two tines equally spaced from the shank;
a fixed support engaging the fork shank allowing the fork to turn;
a combined fork support and drive including a member having two spaced openings slidably receiving said tines, said member having a stud arranged coaxially of the fork shank, said shank and stud establishing an axis of rotation for the spit;
and drive means drivingly connected to the stud to rotate the spit.

10. A spit adapted to be rotatably mounted and to support food thereon to be broiled, comprising:
a fork having a shank and at least two tines equally spaced from the shank;
and a fork support slidably receiving said tines and having a stud arranged coaxially of the fork shank, said shank and stud establishing an axis of rotation for the spit;
a second fork having a shank and a pair of spaced tines;
means on one fork to slidably receive the shank of the other fork;
and means on the other fork to slidably receive the tines of said one fork, whereby the two forks can be engaged by endwise relative movement to form a spit adapted to hold and rotate food with the spit elements rotating as a unit.

11. A basket for holding loose pieces of food to be broiled, comprising:
an open mesh wire basket open at one side and having openings in the mesh of the basket at the two opposite side walls of the basket;
a lid for the basket closing said open side;
and over-center lid fastening means mounted on the lid and including extendible arm members movable outwardly through said openings in the basket walls at opposite sides thereof to hold the lid in place closing said open side, and an over-center operator connected to said arms to extend said arms through said openings.

12. Cooking apparatus comprising:
a stand;
a fire bowl;
stationary grill means supported on the stand for supporting food over the fire bowl;
means raising and lowering the fire bowl relative to the grill means, said last-mentioned means supporting the fire bowl independently of the grill;
leg means carried by the fire bowl adapted to support the fire bowl on the ground when removed from the stand;
and means carried by the fire bowl for supporting the grill over the fire bowl when the fire bowl is resting on said legs.

13. Cooking apparatus as in claim 12 in which the last-mentioned means comprises a post located centrally of the fire bowl and supporting the grill at the upper end thereof, said post extending downwardly through the bottom wall of the fire bowl;
and cable means attached to the fire bowl at one end and passing underneath said post, said cable being attached to means to lengthen or shorten the cable to lower or raise the grill with respect to the fire bowl.

14. A portable charcoal broiler comprising:
a fire bowl adapted to hold a bed of charcoal for broiling food;
a post located centrally of the fire bowl and movable up and down with respect thereto, said post extending downwardly below the fire bowl;
a grill supported above the charcoal bed in the fire bowl on the upper end of said post;
and means for raising and lowering said post and grill thereon, including a flexible member anchored at one end to the fire bowl and attached to the other end a crank means for winding and unwinding the cable thereon to shorten or lengthen the cable, said cable having slack therein and passing underneath the lower end of said post to raise and lower the post relative to the fire bowl.

References Cited

UNITED STATES PATENTS

| | | | |
|---|---|---|---|
| 2,473,569 | 6/1949 | Cast | 126—25 |
| 2,846,941 | 8/1958 | Goodwin | 99—427 X |
| 2,999,452 | 9/1961 | Hardy | 99—419 X |
| 3,078,787 | 2/1963 | Arseneault | 99—419 |
| 3,151,609 | 10/1964 | Hastings | 126—25 |
| 3,188,939 | 6/1965 | Smith | 99—427 X |
| 3,224,362 | 12/1965 | Kozar | 99—419 X |

FOREIGN PATENTS 657,089　2/1938　Germany.

FREDERICK L. MATTESON, JR., *Primary Examiner.*

E. G. FAVORS, *Assistant Examiner.*